United States Patent
Harris et al.

(10) Patent No.: US 6,172,334 B1
(45) Date of Patent: Jan. 9, 2001

(54) TOOL KIT FOR SHIELDED METAL-ARC WELDING

(76) Inventors: Mark James Harris, 70 Grimes Rd., Caribou, ME (US) 04736; Roy Harrison Guidry, Jr., 65 Fleetwood St., Presque Isle, ME (US) 04769

( * ) Notice: Under 35 U.S.C. 154(b), the term of this patent shall be extended for 0 days.

(21) Appl. No.: 09/384,044

(22) Filed: Aug. 26, 1999

(51) Int. Cl.[7] ............... B23K 9/32; B23K 9/007
(52) U.S. Cl. ........................... 219/147; 219/127
(58) Field of Search .................. 219/147, 127, 219/136, 137.2

(56) References Cited

U.S. PATENT DOCUMENTS

| | | | |
|---|---|---|---|
| 2,235,594 | * 3/1941 | Smith | 219/147 |
| 2,390,149 | * 12/1945 | Hopper | 219/147 |
| 2,845,524 | * 7/1958 | Morley | 219/127 |
| 3,617,688 | * 11/1971 | Fogelstrom | 219/127 |
| 3,832,520 | 8/1974 | Glasser . | |
| 4,160,148 | * 7/1979 | Jenkins | 219/98 |
| 4,785,954 | * 11/1988 | Li | 219/147 |
| 4,791,266 | * 12/1988 | Gerard | 219/136 |
| 4,956,540 | * 11/1990 | Kohno et al. | 219/127 |
| 5,241,154 | * 8/1993 | Estrate | 219/147 |

FOREIGN PATENT DOCUMENTS

| | | | |
|---|---|---|---|
| 129177 | * 9/1918 | (GB) | 219/417 |
| WO 93/10933 | * 6/1993 | (WO) | 219/147 |

\* cited by examiner

Primary Examiner—Patrick Ryan
Assistant Examiner—Anjan Dey
(74) Attorney, Agent, or Firm—Thomas L. Bohan; Patricia M. Mathers

(57) ABSTRACT

Welding device to enable a welder to maintain an upright position when welding at floor level. The device is a rigid handle having a pistol-type handgrip and telescoping tubes. The telescoping tubes can be easily adjusted and interlocked, thus providing a handle that is adjustable to a plurality of lengths. The handgrip is angled approximately 90° to the longitudinal axis of the handle and provides for a comfortable and secure grip. The electrode holder used in the welding process can be releasably attached to the distal end of the device. In the Preferred Embodiment, the telescoping tubes and handgrip are hollow, so that a power cable can be fed through the device and connected to the electrode holder. Mounted on the device is a welding shield made of welder's glass, that shields the welder's eyes from the welding flame and protects the welder from sparks arising from the welding site, thus eliminating the need on the part of the welder to wear a welding hood with mask. The device provides for increased safety and comfort of the welder.

2 Claims, 1 Drawing Sheet

TOOL KIT FOR SHIELDED METAL-ARC WELDING

BACKGROUND OF THE INVENTION

1. Field of the Invention

This invention relates to the field of arc welding. More particularly, the present invention relates to a welding-tool holder that allows an operator to maintain an erect stance while welding decking, floors, and other items that are welded at the level of the operator's feet. Yet more particularly, the present invention relates to a welding-tool holder that can be quickly and conveniently adjusted in length. Finally, the present invention relates to a welding-tool holder that can adapt existing shielded metal arc welding equipment.

2. Description of the Prior Art

Welders who use conventional hand-held arc-welding tools to weld floors, decking, and other work at foot level are forced to maintain a working stance that can result in significant ergonomic, health, and safety problems. These welders must work in uncomfortable, bent-over positions that place strain on their backs and legs. This strain can require frequent work breaks for stretching and relief, and can lead to fatigue, discomfort, pain, and disability. Furthermore, this bent-over working stance places the welder's head near and above the weld site. The welder is thus required to wear a cumbersome conventional welding hood for facial protection from flying sparks, and is nonetheless in a position to inhale the hot and noxious fumes that rise directly up from the welding process. During the welding process, the arc-welding electrode is consumed, and thus continuously shortened. This requires the welder to work ever closer to the weld site as the electrode decreases in length. Welders must compensate for the ever-shortening electrode by bending over farther and bringing their faces ever closer to the sparks and fumes emitted from the weld site.

It is therefore desirable to have a welding-tool holder that will enable a welder to maintain an erect stance while welding at foot level. Kohno et al. (U.S. Pat. No. 4,956,540; Issued 1990) disclose an arc spot-welding apparatus that does permit the welder to weld decking and other items at foot level while standing erect. The Kohno et al. apparatus is a complete self-contained arc spot-welding device composed of an electric power supply, a welding-wire feed system, an extended welding torch, and control and supply cables. The disclosed torch is composed of a welding nozzle assembly, a torch body, and a torch handle. The nozzle assembly contains the wire arc welding electrode, holes for the flow of shielding gas, a shielding nozzle, and an operator-pressure switch to activate the welding system. The torch body consists of cylindrical tubes through which the electrical wires, shielding gas, and wire electrode pass through to the nozzle assembly. The length of the torch body can be varied to accommodate operators of different heights by selecting tubes of the appropriate lengths. The disclosed torch handle protrudes from the torch body at an approximately perpendicular angle and contains a trigger switch used to activate the electric current, wire-electrode feed, and flow of shielding gas to the torch nozzle assembly.

The Kohno et al. apparatus is a complete, self-contained, and elaborate system that is specifically designed for arc spot welding with a wire-feed electrode and, thus, is not applicable to shielded metal arc welding. Even if the Kohno et al. apparatus could be adapted for application to shielded metal arc welding, it suffers from several disadvantages: The length of the torch body of the Kohno et al. apparatus is not adjustable; rather, the welding torch must be disassembled and then reassembled with tubing of a different length to adapt it to the tool-length requirements of an operator of a different height. Furthermore, rather than adapting the existing welding equipment to enable the welder to maintain an upright stance while welding floors or decking at the foot level, the Kohno et al. apparatus is a complete system that would replace or supplement existing equipment, at significant cost.

Gérard (U.S. Pat. No. 4,791,266; Issued 1988) discloses a welding device composed of a system of interconnectible extensions that can encompass a 90° bend at the proximal end of the torch head. This welding device includes a torch head and a composite connecting cable that supplies fluid and electric current to the torch head. It is particularly designed for low-power plasma cutting torches and to permit the convenient insertion of extension cables between the device and its supply sources to allow the operator to weld farther from the sources of electric current and fluid.

While the Gérard apparatus might protect the operator's face and arms by allowing them to be farther from the welding site than is possible with conventional welding tools, it is not designed for simple, conventional, shielded metal arc welding and would require that the user's existing welding equipment be replaced or supplemented. As with the Kohne et al. apparatus, the Gérard apparatus would also require that it be disassembled and reassembled to adapt it to the tool-length requirements of a welder of different height or to compensate the decreasing length of a welding electrode as it is consumed in the welding process.

Glasser (U.S. Pat. No. 3,832,250; issued 1974) discloses a welding hook, i.e., a welding torch with an approximately 180° bend at its distal end designed to permit welding of otherwise inconveniently accessible sites. Though this device increases operator safety by increasing the distance between the operator's hands and face and the welding site, the 180° bend in the Glasser device does not permit direct use of this device to weld decking or other items at the level of the operator's feet.

Several examples of prior art disclose welding torches that have a pistol-grip handle that protrudes approximately perpendicular to the longitudinal axis of the torch. A pistol-grip handle affords the operator a more comfortable operating position in many welding situations. Jenkins (U.S. Pat. No. 4,160,148; issued 1979) discloses a stud welding device featuring such a pistol-grip handle. The Jenkins device is a specialized tool designed for welding studs that fasten insulation to the exterior surfaces of cryogen containers and it cannot be used for conventional shielded metal arc welding.

None of the prior art is directed at shielded metal arc welding in which the shield gas is provided in situ by the coating of the welding electrode. Kohno et al. and Glasser disclose tools designed for arc welding with an external source of shielding gas and a continuously fed wire electrode; Gérard discloses a welding tool especially suitable for use as a plasma cutting torch, and Jenkins a specialized tool for welding studs. Gérard, Glasser, and Jenkins disclose welding devices that would not permit an operator to weld decking or other items at foot level while maintaining an upright stance. All of the prior art discloses tools that would replace or supplement a user's currently existing welding tool. None of the prior art discloses a tool that would adapt a user's currently existing welding tool to permit safer and more convenient shielded metal arc welding at the level of the operator's feet.

Therefore, what is needed is a device for protecting those operators engaged in shielded metal arc welding of floors, decking, and other items at the level of the operator's feet. What is further needed is such a device that makes it possible for the operator to perform such welding while maintaining an upright stance, with arms and face protected from noxious fumes and flying sparks emanating from the welding site. What is yet further needed is such a device that can be quickly and conveniently adjusted in length to accommodate the shortening of the welding electrode as it is consumed by the welding process and to accommodate operators of different heights. Finally, what is needed is such a device that is a simple and inexpensive accessory that can be used with existing shielded metal arc welding equipment.

SUMMARY OF THE INVENTION

It is an object of the present invention to provide a welding-tool holder for shielded metal arc welding of floors, decking, and the like at the level of the operator's feet. It is a further object of the present invention to provide such a welding-tool holder that makes it possible for the operator to perform such welding while maintaining an upright position, with arms and face protected from noxious fumes and flying sparks emanating from the welding site. It is a yet further object of the present invention to provide such a welding-tool holder that can be quickly and conveniently adjusted in length to accommodate the shortening of the welding electrode as it is consumed by the welding process and to accommodate operators of different heights. Finally, it is an object of the present invention to provide such a welding-tool holder that is a simple and inexpensive accessory that can be used with existing shielded metal arc welding equipment.

The present invention meets these objectives and overcomes the problems of the prior art by providing a welding-tool holder for conventional shielded metal arc welding that enables the operator to weld items at the operators foot level without bending over. The welding-tool holder has a tube assembly that is easily adjustable in length. The proximal end of the assembly is fitted with a pistol-grip type of handle that is substantially perpendicular to the longitudinal axis of the tube assembly. This enables the welder to grip the holder easily and firmly. The handle and the tube assembly are hollow and constructed of heat-resistant, non-conductive, high-impact plastic material. The distal end of the tube assembly is designed to receive the tool that holds the electrode. The electric cable that connects the electrode holder of the arc welder to an external source of electric current is fed through the handle from the proximal end to the distal end of the tube assembly and connected to the electrode holder. The tube assembly comprises concentric telescoping tubes that allow the overall length of the tube assembly to be adjusted to accommodate the height of the welding operator and, also, to compensate for the decreasing length of the electrode as it is consumed in the welding process. A set screw or other suitable means, such as a spring-biased button on one tube that can snap into any one of a series of holes or can slide and lock into place in a groove in the other tube, can be used to secure the tubes at the proper length. The use of the welding-tool holder increases operator safety and comfort by allowing the operator to work in an upright stance, rather than in a crouched, bent-over position, and by increasing the distance between the face, hands and arms of the operator and the welding site. This reduces the risk of the operator coming into contact with sparks from the welding site and also reduces the risk of the operator inhaling noxious fumes arising from the site.

Furthermore, a shield that protects the face and eyes of the operator can be mounted on the tube assembly. This further improves operator comfort and safety by eliminating the necessity of the operator wearing a cumbersome welding mask and providing the operator with an unobstructed view of the welding site, while simultaneously protecting the operator's eyes from the extreme brightness of the welding flame and the face from sparks arising from the welding site.

DETAILED DESCRIPTION OF THE PREFERRED EMBODIMENT

Figure 1:
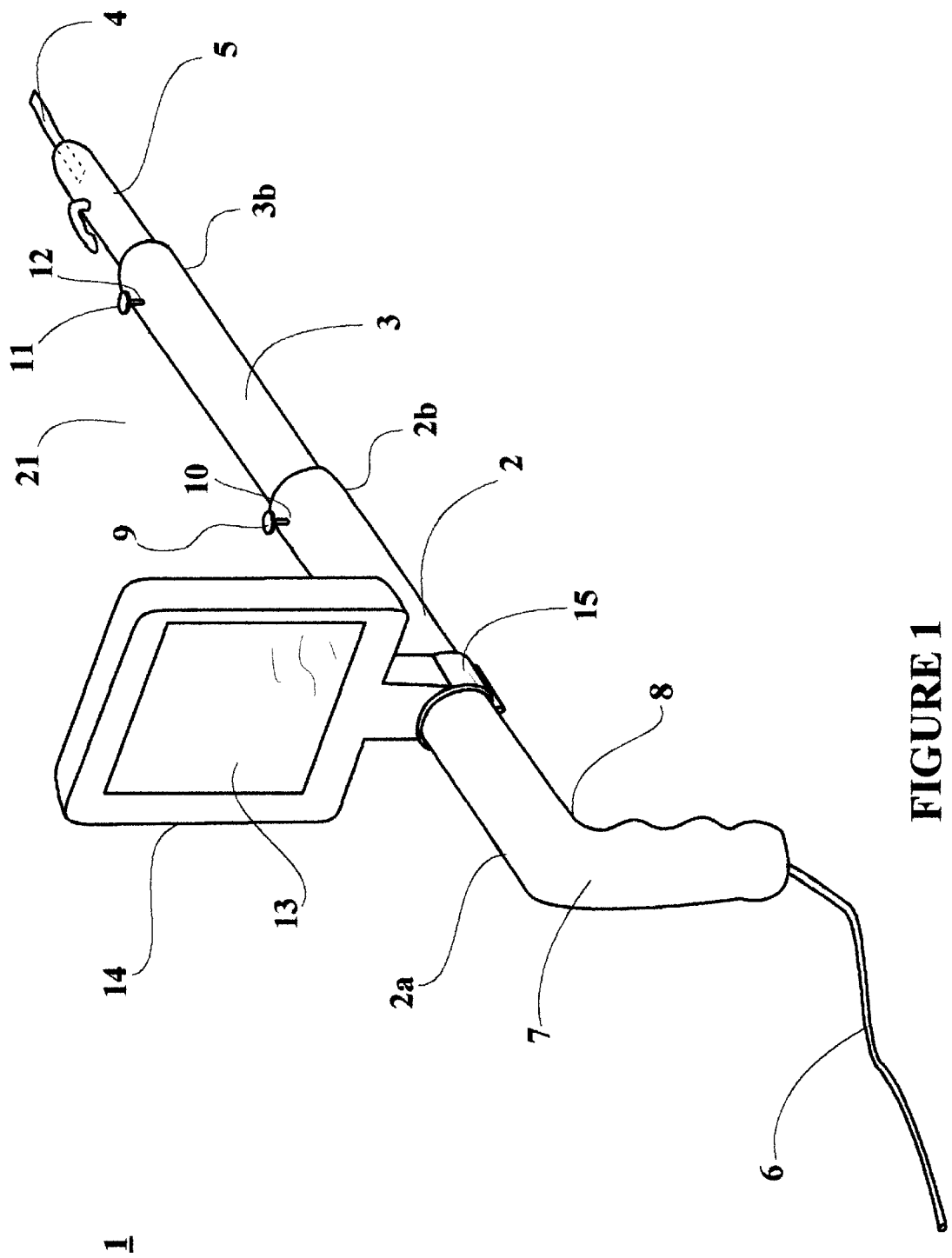
FIG. 1 is a side view of the welding-tool holder equipped with a welding electrode, an electrode holder, a protective shield, and an electric cable leading from an external source of electric power (not shown).

The Preferred Embodiment of the present invention is an adjustable-length welding-tool holder 1. The welding-tool holder 1, comprising a tube assembly 21, a pistol-grip handle 7, and a protective-shield assembly 14, is shown in FIG. 1 fitted with an electrode holder 5 and arc-welding electrode 4. The tube assembly 21 includes an upper tube 2 and a lower tube 3, both of which are hollow and constructed of a high-impact, non-conductive, heat-resistant thermoplastic resin. In the Preferred Embodiment, the pistol-grip handle 7, displaying a bend 8 of approximately 90° with respect to the longitudinal axis of the tube assembly 21, is permanently attached to or integrated into the tube assembly 21 at a proximal end 2a of the upper tube 2 and is also hollow and constructed of the same material as the upper tube 2. In the Preferred Embodiment, a proximal end 3a of the lower tube 3 slides inside a distal end 2b of the upper tube 2 and a first set screw 9 can be engaged in a first hole 10 in the upper tube 2 and tightened against the lower tube 3 so as to secure the length of the tube assembly 21. In this manner, the overall length of the welding-tool holder 1 can be adjusted to accommodate the height of the welding operator or to compensate for the decreasing length of the electrode. In the Preferred Embodiment, it is intended that a conventional shielded metal arc-welding electrode holder 5 will be inserted into a distal end 3b of the lower tube 3 and secured in place by a second set screw 11 engaged in a second hole 12. An electric power cable 6 leading from an external source of electric power (not shown) passes through the hollow interiors of the handle 7 and the tube assembly 21 and connects to the electrode holder 5 to provide electric current to the welding electrode 4. In the Preferred Embodiment, a protective shield 13 made of welder's glass is mounted in the protective-shield assembly 14, the protective-shield assembly 14 being constructed of a high-impact heat-resistant thermoplastic resin molded to fit against the outer surface of the upper tube 2. As shown in FIG. 1, the protective-shield assembly 14 is secured in position on the upper tube 2 by a conventional hose clamp 15.

The welding-tool holder 1 is compact and lightweight and can be conveniently brought to a job location by the operator. In order to use the welding-tool holder 1 with existing shielded metal arc welding equipment, the operator feeds the electric power cable 6 through the pistol-grip handle 7 and the tube assembly 21, and connects the power cable 6 to the electrode holder 5. After attaching the electrode holder 5 to the lower tube 3 and attaching the electrode to the electrode holder 5, the operator can adjust the overall length of the welding-tool holder 1 to achieve a comfortable and safe working posture, and secure the desired length by tightening the first set screw 9. When holding the welding-tool holder 1 in an operating position, the operator can view the welding site through the protective shield 13 that is located on the tube assembly 21 between the welding site and the operator's face. The protective shield 13 shields the operators eyes from the brightness of the welding flame and also protects the operator from the sparks and the noxious fumes rising up from the welding site.

What is claimed is:

1. A welding-tool kit for use with a shielded-metal arc-welding unit comprising a shielded-metal arc-welding electrode-holder, an adjustable handle that includes a telescoping tube assembly having a pistol-grip handle and an upper tube and a lower tube, said lower tube being slidably insertable into a lower end of said upper tube, an adjustment means to adjust and secure an overall length of said tube assembly, and an attachment means to removably attach a distal end of said adjustable handle to said electrode holder, a protective-shield assembly including a frame, a face-and-eye shield made of welder's glass, and a clamping means so as to mount said protective-shield assembly on said adjustable handle, and an arc-welding power cable having a first connector to an arc-welder power source and a second connector to said electrode holder, wherein said adjustable handle is hollow and said arc-welding power cable can be fed through said adjustable handle and connected to said electrode holder by means of said second connector and to said power source by means of said first connector.

2. A welding-tool kit for use with a shielded-metal arc-welding unit comprising a shielded-metal arc-welding electrode-holder, an adjustable handle that includes a telescoping tube assembly having a pistol-grip handle and an upper tube and a lower tube, said lower tube being slidably insertable into a lower end of said upper tube, an adjustment means to adjust and secure an overall length of said of said tube assembly, and an attachment means to removably attach a distal end of said adjustable handle of said electrode holder, and a protective-shield assembly including a frame, a face-and-eye shield made of welder's glass, said glass having a radius of curvature, and a clamping means so as to mount said protective-shield assembly on said adjustable handle, wherein said adjustable handle is hollow and an arc-welding power cable can be fed through said adjustable handle and connected to said electrode holder and to an arc-welding power source.

\* \* \* \* \*